US008626775B1

(12) United States Patent
Harinarayan et al.

(10) Patent No.: US 8,626,775 B1
(45) Date of Patent: Jan. 7, 2014

(54) TOPIC RELEVANCE

(75) Inventors: Venky Harinarayan, Saratoga, CA (US); Anand Rajaraman, Palo Alto, CA (US)

(73) Assignee: Wal-Mart Stores, Inc., Bentonville, AR (US)

( * ) Notice: Subject to any disclaimer, the term of this patent is extended or adjusted under 35 U.S.C. 154(b) by 810 days.

(21) Appl. No.: 11/332,844

(22) Filed: Jan. 13, 2006

Related U.S. Application Data

(60) Provisional application No. 60/644,323, filed on Jan. 14, 2005, provisional application No. 60/695,713, filed on Jun. 29, 2005.

(51) Int. Cl.
*G06F 7/00* (2006.01)
*G06F 17/30* (2006.01)

(52) U.S. Cl.
USPC ............................................. 707/749

(58) Field of Classification Search
USPC ............. 707/7, 5, 706, 709, 736, 748, 749
See application file for complete search history.

(56) References Cited

U.S. PATENT DOCUMENTS

| | | | |
|---|---|---|---|
| 6,691,163 B1 * | 2/2004 | Tufts | 709/224 |
| 2005/0027685 A1 * | 2/2005 | Kamvar et al. | 707/2 |
| 2005/0144162 A1 | 6/2005 | Liang | |
| 2005/0165753 A1 * | 7/2005 | Chen et al. | 707/3 |
| 2006/0122998 A1 * | 6/2006 | Bar-Yossef et al. | 707/5 |

OTHER PUBLICATIONS

Borodin et al., Finding Authorities and Hubs From Link Structures on the World Wide Web, In Proceedings of the Tenth International World Wide Web Conference, Jan. 18, 2002.
Taher H. Haveliwala, Topic-Sensitive PageRank: A Context-Sensitive Ranking Algorithm for Web Search, In Proceedings of the Eleventh International World Wide Web Conference, 2002.
Jeh et al., Scaling Personalized Web Search, In Proceedings of the Twelfth International World Wide Web Conference, 2003.
Jon M. Kleinberg, Authoritative Sources in a Hyperlinked Environment, Journal of the ACM, 1999.
Lempel et al., The Stochastic Approach for Link-Structure Analysis (SALSA) and the TKC Effect, 2000.
Ng et al., Stable Algorithms for Link Analysis, In Proceedings the Twenty-Fourth Annual International ACM SIGIR Conference, 2001.
Page et al., The PageRank Citation Ranking: Bringing Order to the Web, 1998.
Richardson et al., The Intelligent Surfer: Probabilistic Combination of Link and Content Information in PageRank, 2002.
Soumen Chakrabarti, Mining the Web: Discovering Knowledge from Hypertext Data, 2002.

* cited by examiner

*Primary Examiner* — Marc Somers
(74) *Attorney, Agent, or Firm* — David R. Stevens; Stevens Law Group

(57) ABSTRACT

Determining the relevance of a destination page to a topic is disclosed. A plurality of paths that include arrivals at a destination page are determined. A plurality of paths that include arrivals at the destination page are determined. A proportion of the paths that include arrivals at the destination page that also include a preceding arrival at a distinguished page are determined. The relevance of the destination page based at least in part on the proportion is determined.

15 Claims, 12 Drawing Sheets

|  | Original Random Walk | Dual Random Walk |
| --- | --- | --- |
| Links | Inlinks, Outlinks | Invert the link direction |
| Outbound Link Probability | Uniformly Distributed | Proportional to Effective Page Rank (in original Web Graph) of destination: (Page Rank/ # Outlinks) |
| Outbound Teleportation | Uniform for all Pages (1-β) | Inversely proportional to Page Rank |
| Inbound Teleportation | Uniform (1/N) | Proportional to Page Rank |
| Page Rank | P(k) | P(k) |

Fig. 6

TOPIC RELEVANCE

CROSS REFERENCE TO OTHER APPLICATIONS

This application claims priority to U.S. Provisional Patent Application No. 60/644,323 entitled NATURAL RANDOM WALKS: A NEW APPROACH TO FLAVORING filed Jan. 14, 2005; and U.S. Provisional Patent Application No. 60/695,713 entitled TOPIC RELEVANCE filed Jun. 29, 2005; both of which are incorporated herein by reference for all purposes.

BACKGROUND OF THE INVENTION

Search engines, such as are used in conjunction with the Word Wide Web, are typically expected to search through vast amounts of data, yet return a manageable number of quality, relevant results. When attempting to determine which results are most relevant to a user, search engines generally evaluate prospective results for such factors as the number of occurrences of a search term and how close to the top of the document the search term occurs. In some cases, query-independent scores are assigned to individual documents. Such scores may also be taken into account by the search engine when attempting to return the most relevant results.

In some cases, the relevancy of a particular result may depend on the context of the query. For example, suppose that a user submits a query of "jaguar price." A query-independent score does not differentiate results based on context and thus the same hits will be returned to the user, irrespective of whether that user is interested in the car, the cat, or the operating system. There thus exists a continuing need to be able to provide relevant results in response to queries.

BRIEF DESCRIPTION OF THE DRAWINGS

Various embodiments of the invention are disclosed in the following detailed description and the accompanying drawings.

FIG. 6 is a table illustrating properties of walks.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
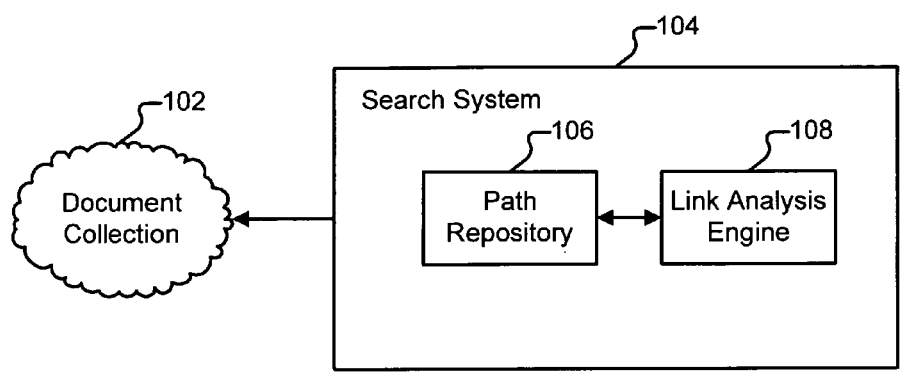
FIG. 1 illustrates an embodiment of a link analysis engine.

FIG. 1 illustrates an embodiment of a link analysis engine. In the example shown, collection 102 is a group of World Wide Web pages, and is crawled and indexed by a search system 104. Hereinafter, when an operation is discussed as being performed on each document in collection 102, it should be understood that the operation may instead be performed on a subset of collection 102, as applicable. The documents in collection 102 are also referred to herein as "web nodes" and "web pages." In some embodiments, the documents in collection 102 can include, but are not limited to text files, multimedia files, and other content. Search system 104 may be a single device, or its functionality may be provided by multiple devices. Elements typically provided in a search system, such as an indexer, are not shown but may be included.

At least some of the documents in collection 102 include links to other documents in collection 102. As described in more detail below, the documents in collection 102 can be represented as a directed graph (hereinafter the "web graph"). In this example, the graph has N nodes, where N corresponds to the number of documents in collection 102. The directed connections between nodes represent the links between documents. For a particular page p, Out(p) is the set of outlinks that lead from the page to other pages. These can be represented in the directed graph as forward links of a node p. Similarly, In(p) is the set of inlinks that lead from other pages to page p. These can be represented in the directed graph as the backward links of a node p.

Path repository 106 contains information associated with the links between the documents in collection 102. For example, in some embodiments, path repository 106 contains a table detailing the inlinks and outlinks of each page in repository 102. In some embodiments, other methods are used to encode linking information.

As described in more detail below, link analysis engine 108 is used to analyze link information such as is provided by path repository 106. The information can be used, for example, to determine the relevance of a document to one or more topics (which can be defined by another document, or a group of documents, such as a seed set). The information can also be used to assign one or more scores to documents. In some cases, multiple scores are combined into a single score such as by using a weighted average. The scores can be used to rank pages, for example, in response to a search query, based on a variety of functions.

In some embodiments, the information in path repository 106 includes information supplied, such as by a third party, rather than extracted from collection 102 by a search system 104. In some embodiments, path repository 106 and link analysis engine 108 are not part of a search system (e.g., they form a link analysis system) and/or other components of search system 104 are omitted.

Figure 2:
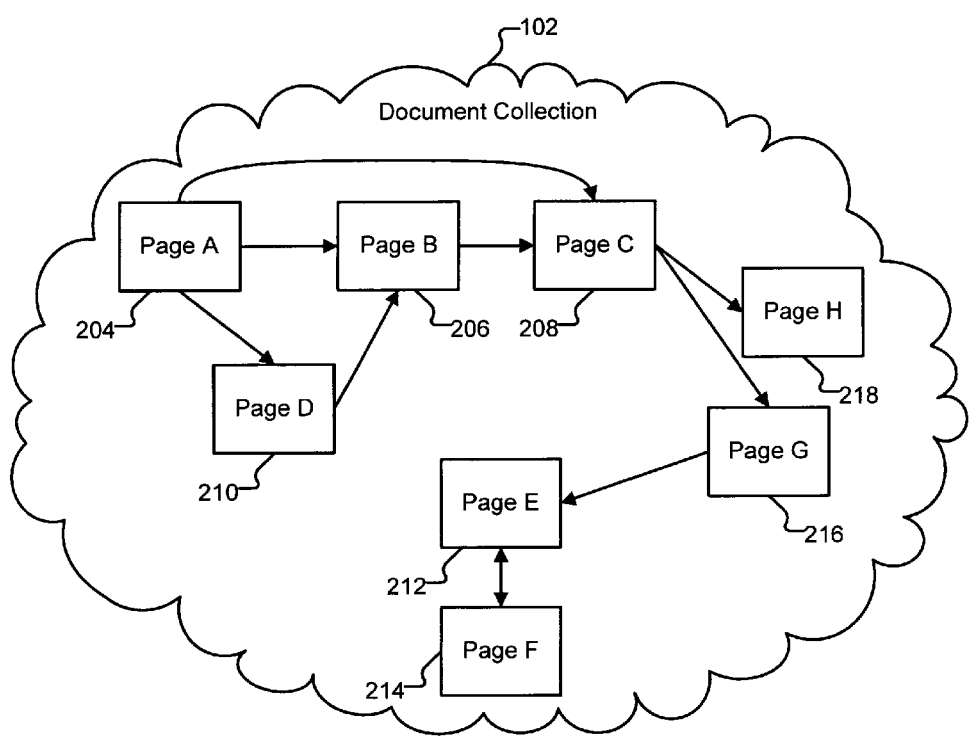
FIG. 2 illustrates sample documents in a collection having link structure.

FIG. 2 illustrates sample documents in a collection having link structure. In the example shown, a collection, such as collection 102 includes several documents 204-218. Here, page A has three outlinks—they lead to pages B, D, and C. The direction of the link is indicated here with an arrow head. Page B has two inlinks (from pages A and D) and one outlink (to page C). Pages E and F link to each other. Thus, page E has two inlinks (page G and page F) and one outlink (page F), while page F has one inlink and one outlink (page E in both cases).

Page B is "reachable" from page A in this case because there is a direct link leading from page A to page B. In addition to direct links, however, a page can also be reachable from pages that are not directly linked. In this example, page C is reachable from page D because a person visiting page D could follow an outlink from page D to page B, and then follow another outlink from page B to page C. As discussed more fully below, the reachability of a page can be conceptualized as the probability that a random surfer beginning on a first page will wind up on a second page.

Figure 3A:
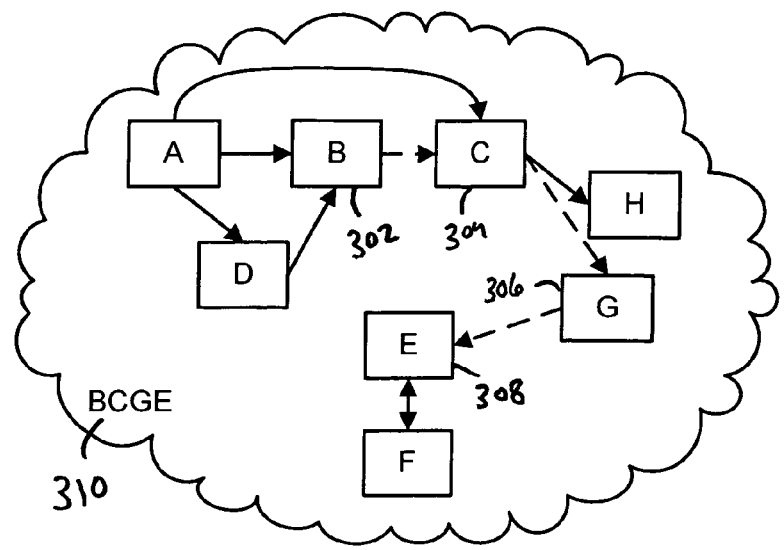
FIG. 3A is an example of a natural random walk.

FIG. 3A is an example of a natural random walk. In a typical random surfer model (also referred to herein as the unbiased model/random walk, performed by an unbiased surfer), a surfer starts at a random page on the web and begins surfing. If the surfer is currently at page p, the page q that the surfer visits at the next time step is determined in the unbiased model as follows: with probability $\beta$, the surfer picks a link uniformly at random from the set of outlinks of p, and follows it to reach a new page; with probability $1-\beta$, the surfer randomly teleports to a page picked uniformly at random from all of the pages on the World Wide Web. The value $\beta$ is typically set to 0.85. The walks that the random surfer performs are referred to herein as "paths." In this example, the generated path indicates that documents could be accessed by following the walk. The walk itself is typically simulated, such as by one or more methods of approximating or modeling the behavior of a random surfer, rather than performing an actual random walk.

For each page p in collection 102, the probability that the unbiased surfer visits p at the current time step converges to a value that depends only on the link structure of the web. This probability is the stationary probability of page p and is referred to herein as the "Page Rank" of page p. The vector r that lists, for each page, its Page Rank is referred to herein as the Page Rank vector r, and can be given as:

$$r = \beta A r + (1-\beta) u \quad (1)$$

Where:
r is the Page Rank vector
$\beta$ is a probability, typically set to 0.85
A is a matrix that encodes the link structure of a collection
u is a vector corresponding to uniform random teleportation If there are N pages in collection 102, u has N entries, each equal to 1/N.

A random walk R is composed of many "natural random walks" created by breaking the random walk, R, at each teleportation step. Consider the following random walk, R, made up of assorted web pages (denoted by $W_x$, where x is a number between 1 and N, inclusive) and teleports (denoted T):

$$R = W_1 W_8 W_3 T W_{12} W_2 W_3 W_{11} W_{20} W_{31} T \ldots$$

The first two natural random walks in R are as follows:

$$R_1 = W_1 W_8 W_3$$

$$R_2 = W_{12} W_2 W_3 W_{11} W_{20} W_{31}$$

In the example shown in FIG. 3A, a natural random walk (denoted by a dashed line) began at page B (302), continued to page C (304), then continued to page G (306), then continued to page E (308) before teleporting. Thus, in the example shown in FIG. 3A, the natural random walk was of length 4, notated as path BCGE (310).

Figure 3B:
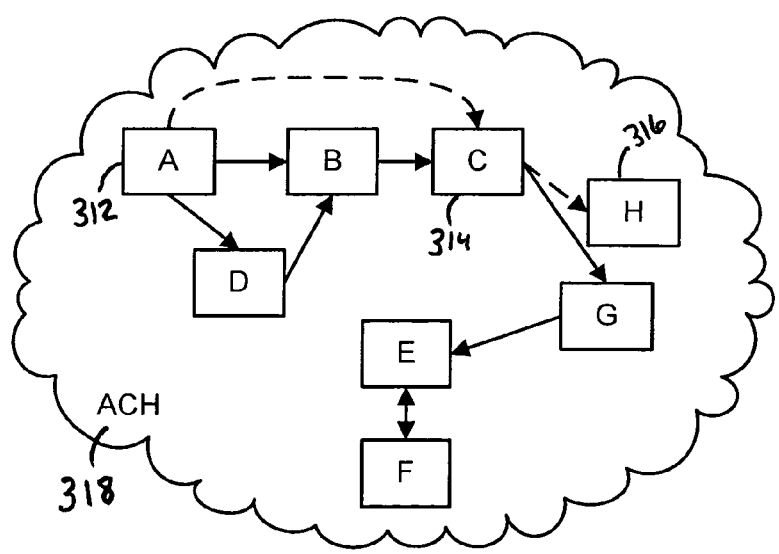
FIG. 3B is an example of a natural random walk.

FIG. 3B is an example of a natural random walk. After teleporting from page E (308), a new random walk was begun on page A (312). The walk continued from page A to page C (314), and then continued to page H (316) before teleporting. Thus, in the example shown in FIG. 3B, the random walk was of length 3, notated as path ACH (318).

Market Basket Analysis

As described in more detail below, topic score and topic relevance measure different properties of a page in a topic—popularity and relevance.

The natural random walk framework can be viewed in the context of data mining, in particular market basket analysis. A traditional problem in data mining is determining "association rules" given market baskets.

Assume there is a list of contents of every grocery cart (market basket) that was checked out at a grocery store. This data can be mined to see how some products should be placed in the store. For example, if every purchase of diapers is also accompanied by a purchase of beer, i.e., Diapers→Beer, it may be profitable to locate the beer near the diapers.

Two metrics used in data mining are the confidence (i.e., what is the probability that X→Y) and the support (i.e., how many times do X and Y appear together in the market baskets).

Support can be used to prevent the making of decisions based on very sparse data. For example, if exactly one person purchased vodka, and they bought it with diapers, Vodka→Diapers with confidence 1. However, the support would be very low.

Natural random walks can be seen as market baskets. The topic relevance of a page X in topic F is the Confidence that X→F. The topic score of X is the support. Thus, topic score and topic relevance are fundamentally different metrics. One way to employ both scores is to use support as a threshold and confidence as a final score. In other embodiments, other combinations of the functions are used.

A "distinguished" page is used herein to mean a page that is of interest in determining the relevance of one or more pages to a topic. For example, a highly informative site may be used to define a topic (e.g., medline.com for health, or imdb.com for movies.) As described in more detail below, in some cases, the distinguished page is a member of a group of pages that define a topic. For example, the distinguished page may be part of a seed set of pages, such as the seed sets used in the methods described in U.S. Patent Application No. 60/644,325, entitled DOUBLE ITERATIVE FLAVORED RANK ("DIFR"), filed Jun. 22, 2005 which is incorporated herein by reference for all purposes.

Figure 4A:
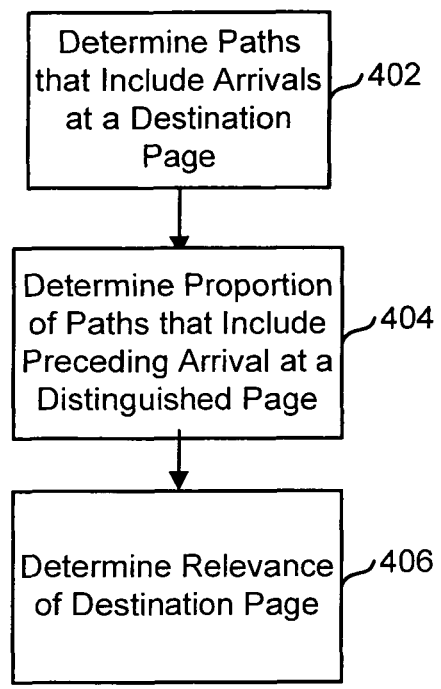
FIG. 4A illustrates an embodiment of a process for determining the relevance of a document.

FIG. 4A illustrates an embodiment of a process for determining the relevance of a document. In this example, the relevance of a destination page to a distinguished node is determined. As described in more detail below, other methods may be used to determine the relevance of one document to multiple documents, and/or to combinations of documents.

This process may be implemented in link analysis engine 108. In the example shown, the process begins at 402 when paths that include arrivals at a destination page are determined. A simplified numeric example of an iterative method for determining such paths is given in FIGS. 5A-5D to help illustrate the process conceptually. As described in more detail below, in some embodiments, more efficient processes are employed to implement and/or model the determination of paths.

At 404, the proportion of paths that include visiting the distinguished page before reaching the destination page is determined. For example, in FIG. 2, if page B is a distinguished node, and page G is a destination node, all paths that lead through page G (e.g., CGE, BCG, GE, ACGE) would be included in the processing at 402. Only the paths in which page B was visited before page G would be included in determining the proportion at 404. For example, ABCG and ADBCG visit page G after visiting page B, while CGE does not.

At 406, the relevance of the destination page is determined. As described in more detail below, various methods of determining the relevance of a destination page may be employed. For example, the relevance of a page to a group of pages may be determined. In some embodiments, relevance is determined by combining multiple values, such as a DIFR score and/or score deta reverse relevance score.

In some embodiments, portions 404 and 406 of FIG. 4A are combined—the relevance of a destination page to a distinguished node is determined by assigning a score based on dividing the number of paths that include preceding arrival at a distinguished page by the total number of paths the include arrivals at the destination page. This is the case, for example, in the process depicted in FIGS. 5A-5D and is referred to as a topic score.

Figure 4B:
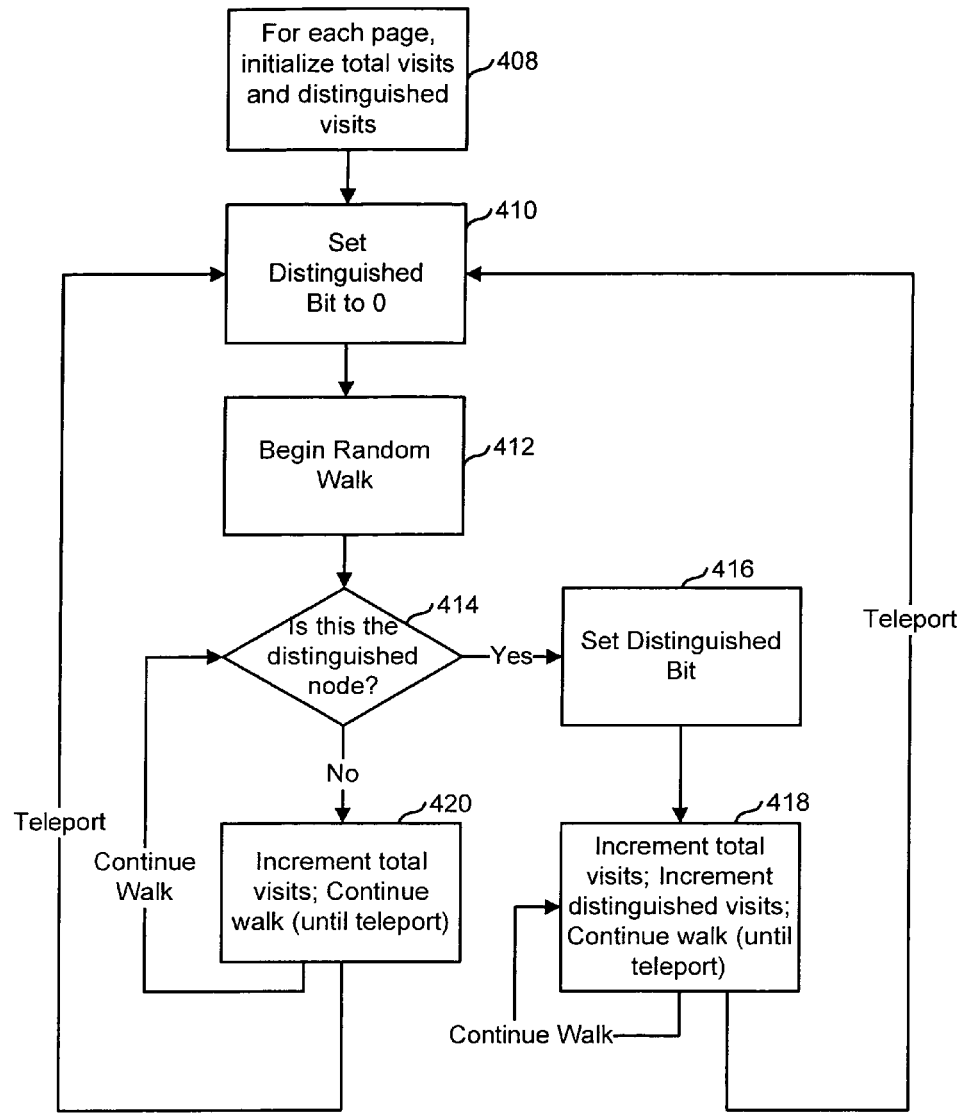
FIG. 4B illustrates a simplified embodiment of a portion of a process for determining the relevance of a document.

FIG. 4B illustrates a simplified embodiment of a portion of a process for determining the relevance of a document. The process depicted in FIG. 4B could be an example of an implementation of portions 402 and 404 of FIG. 4A as applied to collection 102.

A topic score for a destination page can be computed by "counting" the number of times that a distinguished page was encountered before the destination page in a series of natural random walks.

In an example random walk, assume each web page has a total visit counter. Each time the random surfer visits the web page, he increments the page's total visit count by 1. Now assume that the random surfer can carry finite state information along while performing random walks. For example, suppose the random surfer carries around the Boolean variable "Visited_F". The value is initially set to 0. When the random surfer visits a page F, the variable is set to 1. When the random surfer teleports, his states (such as the Visited_F variable) are reset to 0. In this example, page F is a distinguished node.

Each web page has one or more additional counters, such as a counter $Count_F$. When the random surfer visits the web page, he updates the page's counters appropriately based on his state information. In some embodiments, rather than having counts increment by the same value (e.g., 1), the increment values are based at least in part on the distance between the distinguished page and the current page.

One method of updating a page's counters is given below in the following pseudocode:

```
/* on visiting Web Page X */
/* increment the Link Score Counter */
Total_Visits(X)++;
/* do distinguished visit logic (F is a distinguished node)*/
If (X==F) {
    Visited_F=1;
}
If (Visited_F){
    CountF(X)++;
}
/* on teleport */
Visited_F=0;
```

Based on the above pseudocode, the Page Rank of a web page X can be written as follows:

$$P(X) = \frac{Count(X)}{\sum_{i \in Web} Count(i)} \quad (2)$$

The topic score of page X in the topic F can be written as follows:

$$P_F(X) = \frac{Count_F(X)}{\sum_{i \in Web} Count_F(i)} \quad (3)$$

In the example shown, the process begins at 408 when, for each document in collection 102, a total visit count and a distinguished visit count are initialized. In this example, a single distinguished page is tracked. As described in more detail below, in some embodiments, multiple pages may be distinguished, and the process is modified accordingly.

One method of initializing the counts is to set both values to 0 for all pages in collection 102. In some embodiments, other methods are used for initialization, such as by setting specific values for particular pages.

At 410, the distinguished bit, which tracks whether or not a surfer has visited the distinguished node, is set to 0, indicating that the distinguished node has not yet been visited.

At 412, a random walk is begun. If an encountered page is the distinguished node (414), at 416, the distinguished bit is set, for example to 1. Additionally, the total visits counter and the distinguished visits counters of the distinguished page are incremented (418). The random walk continues and each subsequently encountered page has its total visit counter and distinguished page counter incremented, until teleport occurs. Upon teleport, the random surfer's distinguished bit is reset to 0 (410) and a new random walk is begun (412).

During the random walk, until the distinguished node is visited (414), each visited page has its total number of visits counter incremented (420), but does not have its distinguished page counter incremented. In this example, the process terminates when convergence is reached (not shown).

The methods presented in conjunction with FIG. 4B are given in part to help conceptualize a process for computing the relevance of a page. While the equations presented can be used to compute relevance, to do so would require, for each page p, a very large number of computations, especially when collection 102 is large. As described more fully below, in some embodiments, more efficient processes are employed to calculate scores.

A simplified numeric example of an iterative version of the process shown in FIG. 4B is given in FIGS. 5A-5D to help illustrate the process conceptually. For simplicity of illustration, the values given in FIGS. 5A-5D are not normalized to maintain unity.

Figure 5A:
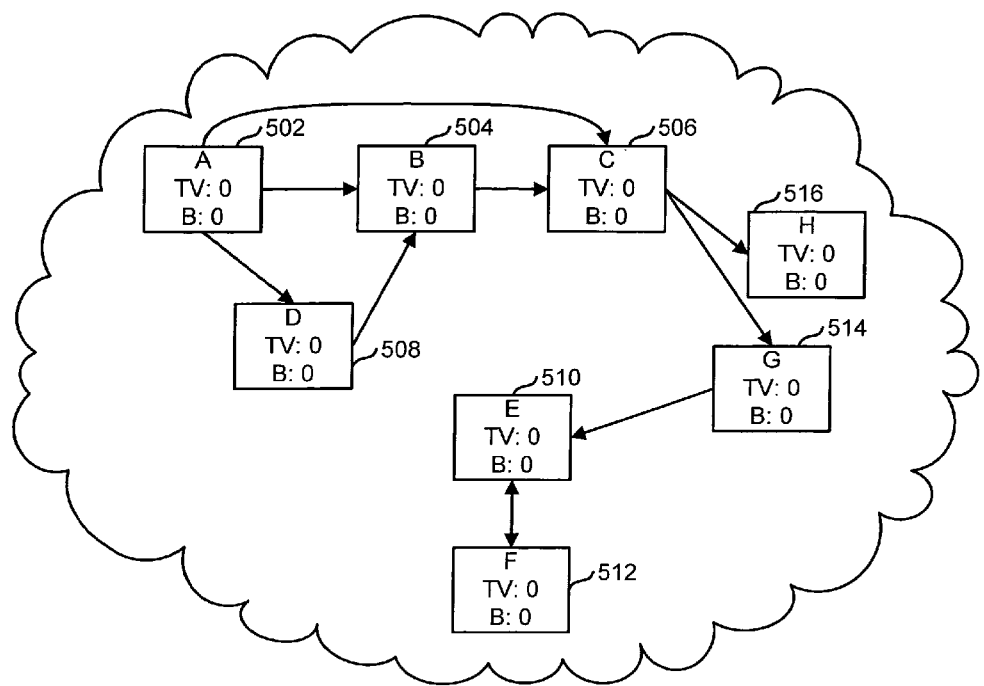
FIG. 5A illustrates a simplified embodiment of a portion of a process for assigning scores to a collection of documents.

FIG. 5A illustrates a simplified embodiment of a portion of a process for assigning scores to a collection of documents. The process depicted in FIG. 5A could be an example of an implementation of portion 408 of FIG. 4B as applied to collection 102. In the example shown, nodes A-H (502-516) are included in collection 102. Node B is a distinguished node. Their total visit counts (represented here as "TV"), and their visits that were preceded by a visit to the distinguished node (represented here as "B") are initialized to 0.

Figure 5B:
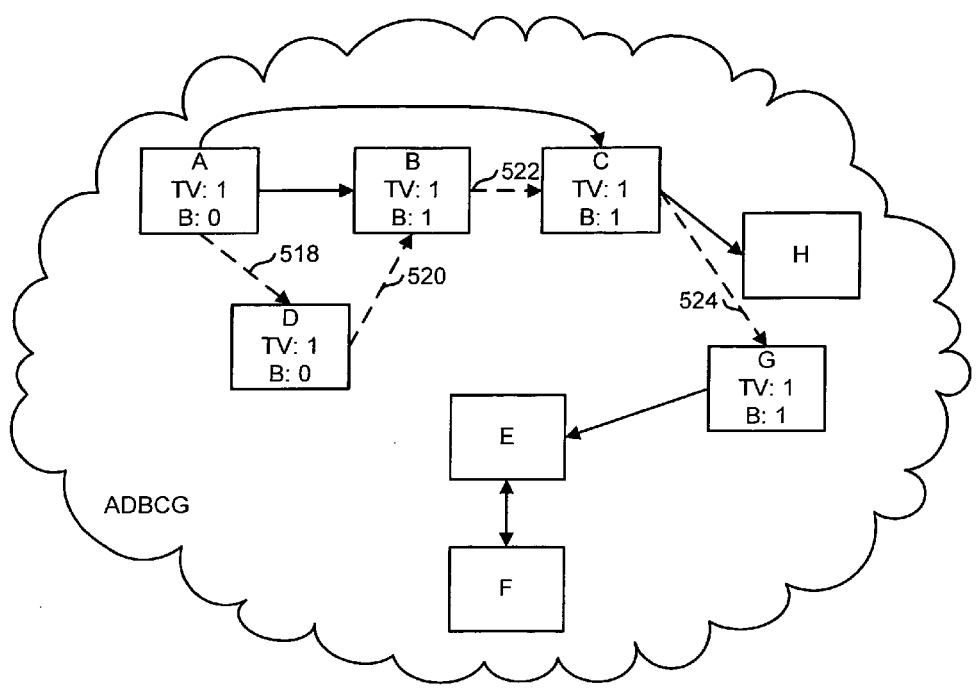
FIG. 5B illustrates a simplified embodiment of a portion of a process for assigning scores to a collection of documents.

FIG. 5B illustrates a simplified embodiment of a portion of a process for assigning scores to a collection of documents. The process depicted in FIG. 5B could be an example of an implementation of portions 410-418 of FIG. 4B. The distinguished bit is set to 0 (not shown). A random walk beginning at node A is performed (represented herein as a dashed line). Since node A is not the distinguished node, only its total visit counter is incremented. The second page in the random walk is node D (518). Node D's total visit count is incremented, but its B count is not, because the random surfer has not yet visited node B. The third page in the walk is node B, the distinguished node (520). Both of node B's counters are incremented. The fourth page visited in the walk is node C (522). Both of node C's counters are incremented. The fifth page visited in the walk is node G (524). Both of node G's counters are incremented.

Figure 5C:
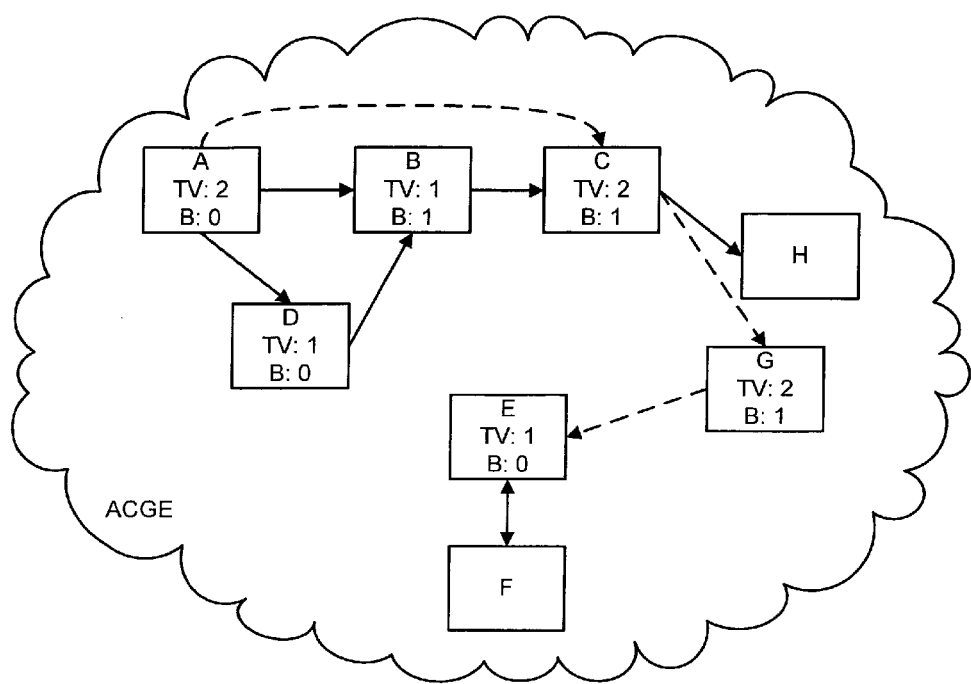
FIG. 5C illustrates a simplified embodiment of a portion of a process for assigning scores to a collection of documents.

FIG. 5C illustrates a simplified embodiment of a portion of a process for assigning scores to a collection of documents. The process depicted in FIG. 5C could be an example of an implementation of portions 410-418 of FIG. 4C. After teleporting, the distinguished bit is again set to 0 (not shown). In the random walk shown, the distinguished page, node B, is not encountered before teleport. Thus, each visited page has its total visit counter incremented, but not its B counter.

Figure 5D:
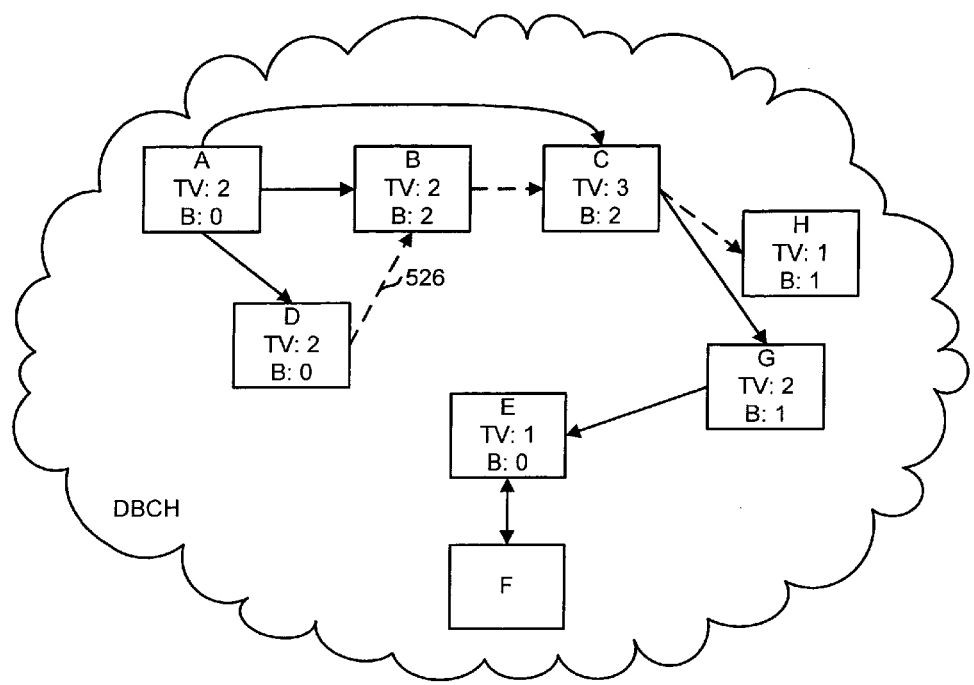
FIG. 5D illustrates a simplified embodiment of a portion of a process for assigning scores to a collection of documents.

FIG. 5D illustrates a simplified embodiment of a portion of a process for assigning scores to a collection of documents. The process depicted in FIG. 5D could be an example of an implementation of portions 410-418 of FIG. 4C. After teleporting, the distinguished bit is again set to 0 (not shown). In the random walk shown (this time beginning at node D), page B is encountered as the second page in the walk (526). Thus, node D has only its total visit counter incremented, while nodes B, C, and H have both counters incremented.

After the processing of FIG. 5D, the following basic relevance has been determined. Node A has a relevance score is 0, or 0 divided by 2. The same holds true for Node D, which has the same score. Node B has a relevance score is 1 (1 divided by 1). Node C has a relevance score of 0.666, or 2 divided by 3. The scores of the other nodes in FIG. 5D can be similarly computed. These scores indicate the percentage of traffic (in the sense of number of visits, not kilobytes) that each node received via node B.

Topic Relevance

Typically, if one page links to another, it indicates that there is something in common between the two pages. For example, a page containing general information about the sport of football may link to team sites. Similarly, a team page may link to ticket sales, to local information about the city in which the team resides, or to television schedules. However, in some cases, the only commonality between pages in the same natural random walk is that they are in close proximity to each other.

For example, a page containing a salad recipe may link to the restaurant in which the page author first tried such a salad. The restaurant page may in turn link to the page of an artist, whose works are displayed on the restaurant walls. It is possible that a fairly large amount of traffic may flow from the salad recipe page to the artist's page, for example, if the recipe site is well known. Nonetheless, the two pages, one for a salad recipe, and one for a portrait painter, have effectively little to do with each other.

In a random walk R, consider a page X that appears often after F and so has a high topic score. Page X can also appear often, in general, whether or not F precedes it. Page X may thus have little to do with F, outside of the fact that it is "close" to F. A topic score is thus a measure of proximity to F and popularity, not necessarily the relevance to the topic.

For the same two pages X and F, a question can be asked: What is the confidence that X→F ? If X appears in a natural random walk, what is the probability that it is preceded by F? If this probability, P(X→F), is large, F appears most of the time X appears. Page X can be seen as a captive of F—since it can only be reached through F, its only purpose is to serve F, and so it must be highly relevant to F. Based on the standard random surfer:

$$P(X \to F) = \frac{\text{Count}_F(X)}{\text{Count}(X)} \quad (4)$$

The ratio of the topic score of X in F to the link score of X can be referred to as $\Delta_F(X)$. The relevance of a page X to a topic F, denoted by $\text{Rel}_F(X)$ can be given as:

$$\text{Rel}_F(X) = P(X \to F) = \frac{\Delta_F(X)}{\Delta_F(F)} \quad (5)$$

The above formulation is independent of the teleportation probability, the memoryless nature of the random walk, etc.

If the natural random walks are viewed as a collection of strings, the result above holds for any collection of strings. The set of strings that can appear as natural random walks is the same as those accepted by the web graph viewed as a finite state automaton (FSA) constructed as follows: Add a new node T that represents teleport to the web graph FSA. Node T has edges to and from every other node in the web graph. Here, every edge is labeled with the destination page's symbol. Thus edge (x,y) has the label y. Node T is the start state and also the success state. The set of strings accepted by this FSA is identical to the set of strings that are the natural random walks on the web graph. In some embodiments, the Markovian world is used to model the frequency of occurrence.

Propagating Topic Relevance Through the Web Graph

Topic relevance is a probability measure and so has a value between 0 and 1. Thus it should be the case that for all X, $\Delta_F(F) \geq \Delta_F(X)$.

Consider a topic defined by page F, and a given page X, where X is different from F. As determined previously, $$\Delta_F(X) = \frac{P_F(X)}{P(X)}.$$

The Page Rank of X can be defined in terms of X's neighbors:

$$P(X) = \beta \times \sum_{Y \text{ neighbor of } X} \frac{P(Y)}{O(Y)} + \frac{(1-\beta)}{N} \qquad (6)$$

Where $1-\beta$ is the teleport probability, $O(Y)$ is the number of outlinks of Y, and N is the number of pages in the web graph. In some embodiments, if the Page Rank of X is much larger than the incoming teleportation probability (a fixed number), the contribution of teleportation can be ignored and the equation can be rewritten as:

$$P(X) = \beta \times \sum_{Y \text{ neighbor of } X} \frac{P(Y)}{O(Y)} \qquad (7)$$

Consider now the topic rank of X. Since the random walks are memoryless, the topic rank of X in both cases is the same, if the topic is defined as a single page, as is the case in this example. Given that X is different from F, there is no teleportation to X in the topic definition, thus:

$$P_F(X) = \beta \times \sum_{Y \text{ neighbor of } X} \frac{P_F(Y)}{O(Y)} \qquad (8)$$

Now:

$$\Delta_F(X) = \frac{\sum_{Y \text{ neighbor of } X} \frac{P_F(Y)}{O(Y)}}{\sum_{Y \text{ neighbor of } X} \frac{P(Y)}{O(Y)}} \qquad (9)$$

The "Effective Page Rank" of a page Y, denoted as Q(Y), can be defined as:

$$Q(Y) = \frac{P(Y)}{O(Y)} \qquad (10)$$

Now, $$\Delta_F(X) = \sum_{Y \text{ neighbor of } X} \frac{Q(Y)}{\sum_{Z \text{ neighbor of } X} Q(Z)} \times \Delta_F(Y) \qquad (11)$$

Thus, $\Delta_F(X)$ is the weighted-average of the deltas of all X's neighbors, where the weights are the effective Page Ranks of the neighbors.

A Web Page with a high effective Page Rank is generally more influential in propagating its delta than a page with a low effective Page Rank. Thus, in some embodiments, the seed set includes pages with a high effective Page Rank.

Topic drift can happen when a page with high effective Page Rank and low delta links to a page with a high topic rank. High effective Page Rank pages are topic arbiters, diffusing deltas through the Web Graph.

Multi-Page Topics

Topics can be defined using multiple web pages. For simplicity, consider a Topic "F+G" defined by two web pages F and G. Using the natural random walk framework, the topic rank of any page X in this topic F+G is the average of the topic rank of X in F and X in G.

In some embodiments, topics are defined as a property of the general random walk on the web graph, not by defining a new random walk. The notion of topic relevance is one outcome of taking this approach.

For single-page topics, the two approaches end up being the same. This is not the case for multi-page Topics.

First, consider the logic the random surfer adopts for multi-page Topics. For simplicity, assume a two-page Topic defined by pages F and G. The following pseudocode describes the rules that govern the random surfer:

```
/* do distinguished visit logic */
If ((X==F)||(X==G)) {
Visited_FG=1;
}
If (Visited_FG){
Count_FG(X)++;
}
/* increment the Page Rank Counter */
Count(X)++;
/* on teleport */
Visited_F=0;
```

A topic rank of a page X in topic F+G can be given as:

$$P_{FG}(X) = \frac{\text{Count}_{FG}(X)}{\sum_{J \in Web} \text{Count}_{FG}(J)} \qquad (12)$$

Assume that F and G are mutually exclusive (i.e., G never shows up in a natural random walk with F). This can be written as $P_F(G)=P_G(F)=0$. In this case:

$$P_{FG}(X) = \frac{\text{Count}_F(X) + \text{Count}_G(X)}{\sum_{J \in Web} \text{Count}_F(J)} + \sum_{J \in Web} \text{Count}_G J \qquad (13)$$

It can be shown that:

$$\frac{\sum_{J \in Web} \text{Count}_F(J)}{\sum_{J \in Web} \text{Count}_G(J)} = \frac{\Delta_G(G)}{\Delta_F(F)} \qquad (14)$$

The inverse of $\Delta$ is denoted here by $\Delta^*$. That is, $$\Delta_F^*(F) = \frac{1}{\Delta_F(F)}.$$

Based on the above equations, $$P_{FG}(X) = \frac{\Delta_F^*(F)}{\Delta_F^*(F) + \Delta_G^*(G)} \times P_F(X) + \frac{\Delta_G^*(G)}{\Delta_F^*(F) + \Delta_G^*(G)} \times P_G(X) \qquad (15)$$

In some embodiments, in a multi-page topic, if it is assumed the pages defining the topics are mutually exclusive in the natural random walks, then the topic rank is the weighted average of the topic rank in the corresponding single-page topics. The weights are the corresponding Δ*s.

The weights for each single-page topic score can be based on its corresponding Δ* for it to correspond to a property of the original Random Walk.

If the pages that define the topic are not mutually exclusive, the computation is made more complex. The natural random walks in which F and G both occur will be double counted if the above analysis is used.

Assume F, G, and X, occur exactly once in a natural random walk. It can be shown that the average number of occurrences of any page Y in a natural random walk, given that Y appears at least once, is given by:

$$\frac{P_Y(Y)}{(1-\beta)}.$$

In some embodiments, the X's that are double-counted are backed out. Page X will be double counted where there is both an F and a G preceding the X. The number of X's in the F→G→X sequence is given by: $Count_A(B) \times P_B(X)$. Similarly, for G→F→X.

For the denominator, sequences of the form F→G→T (teleport) are double counted. Every page in the sub-sequence G→T is double counted. Given that G has occurred, the average number of web pages in G→T is $$\frac{1}{(1-\beta)}.$$

This is similar for sequences of the form G→F→T.
$P_{FG}(X)$ can be written as follows:

$$P_{FG}(X) = \frac{\Delta_F^*(F) \times P_F(X) + \Delta_G^*(G) \times P_G(X) - \Delta_F^*(F) \times P_F(G) \times P_G(X) - \Delta_G^*(G) \times P_G(F) \times P_F(X)}{\Delta_F^*(F) + \Delta_G^*(G) - \frac{\Delta_F^*(F) \times P_F(G)}{(1-\beta)} - \frac{\Delta_G^*(G) \times P_G(F)}{(1-\beta)}} \quad (16)$$

Dual Random Walk

One topic that can be asked about a document is, given X, what topic(s) does it "belong" to? One possible application of this question is the ability to categorize (cluster) the entire web. Another is to determine the set of topics that encompass a collection of documents.

Given a web page X, for all possible topics F, give the confidence and support that X belongs to F. In this example, assume that topics are defined by a single web page. For example, consider only those natural random walks where X appears. One way to find the set of pages F that consistently precede X in these natural random walks is to first focus on topic relevance. If when X appears in a natural random walk it is preceded by F with high probability, then X→F. Now, given X, what are the Fs that precede it with high probability?

One way to solve this problem is to create a dual web graph. The nodes of the dual web graph are the web pages, just like in the original web page. However, the directionality of all links in the original web graph are inverted. Thus all inlinks in the original web graph are now outlinks in the dual web graph and vice versa. The random walk on this dual web graph can be denoted by $R^D$.

One property satisfied by $R^D$ is that every natural random walk that appears in R appears reversed in $R^D$, and the same number of times. $R^D$ preserves Page Rank. This property in Markov Chains is called "reversibility". If the natural random walks are strings, in the dual, all of the strings are reversed. R and $R^D$ are said to be reversible, if and only if:

$$P(j) \times \pi(j,k) = P^D(k) \times \pi^D(k,j) \quad (17)$$

Here, P(j) is the Page Rank of j, $P^D(k)$ is the Page Rank of k in the Dual Web Graph, and π(j,k) is the probability that edge (j,k) is followed. When R and $R^D$ are reversible, by definition $P^D(k)=P(k)$. Thus:

$$P(j) \times \pi(j,k) = P(k) \times \pi^D(k,j) \quad (18)$$

The transition probabilities in the dual web graph, $\pi^D(k,j)$ can be defined as follows:

$$\pi^D(k, j) = \frac{\beta \times P(j)}{O(j) \times P(k)} \quad (19)$$

where O(j) is the number of outlinks of j. All the outbound probabilities (including teleportation) from a page sum to 1:

$$\sum_{1 \text{ neighbor of } k} \pi_D(k, 1) + T_O^D(k) = 1 \quad (20)$$

Here, $T_O^D(k)$ is the probability of teleportation out of k in the dual web graph. Teleportation is defined differently in the dual web graph:

$$T_O^D(k) = \frac{(1-\beta)}{(N \times P(k))} \quad (21)$$

Teleportation is more likely out of lower Page Rank nodes in $R^D$. If all pages have equi-probability $$\frac{1}{N},$$

then the outbound teleportation probability becomes what is seen in the standard Page Rank algorithm.

To determine $T_I^D(k)$, the teleportation probability into page k. consider P(k) in the dual web graph:

$$P(k) = \sum_{1 \text{ neighbor of } k} P(1) \times \pi^D(1, k) + T_I^D(k) \quad (22)$$

Substituting for $\pi^D(1, k)$:

$$T_I^D(k) = (1-\beta) \times P(k) \quad (23)$$

Teleportation in the dual web graph thus behaves as follows: teleport occurs out of any page k with probability:

$$\frac{(1-\beta)}{(N \times P(k))}.$$

Once teleportation out occurs, teleportation into any page j on the web can occur with probability proportional to its Page Rank P(j). The probability of teleport, across all pages, just as with the original web graph is (1−β).

FIG. 6 is a table illustrating properties of walks. Assuming the probability of teleport into any page is proportional to its Page Rank, the desired incoming teleport probability for the page can be obtained.

Topic Relevance, Topic Score and the Dual Web Graph

Given a page X, for every possible topic (e.g., page) F on the web, what is $P_F(X)$ and $Rel_F(X)$? Given a topic page F, the topic rank and the topic relevance for every Page can be computed based on this topic F.

Given any page X, it is possible to find its topic score and topic relevance for every possible topic F. Consider A, an N×N matrix, where $A[j,k]=Rel_k(j)$. Here, topics (as defined by web pages) are the columns and web pages are the rows. The diagonal of this matrix is 1 (since $Rel_k(k)=1$). A is an N×N matrix since in this example every web page also defines a topic. The dual random walk can be used to determine the values of all elements in a given row of the matrix.

For the analysis below, assume that no page appears more than once in any natural random walk. Example identities between the regular random walk and the dual random walk follow. $P(X)=P^D(X)$ (Page Rank is conserved). Thus, $Count(X)=Count^D(X)$. By reversing strings the number of times any symbol appears does not change.

The number of regular natural random walks in which F appears followed by X is the same as the number of dual natural random walks in which X appears followed by F. Further, since no page appears more than once in a natural random walk (regular or dual): $Count_F(X)=Count_X^D(F)$.

Example: Consider the Natural Random Walks (strings): FCX, XF, CD. Here, the Dual Random Walks are the reverse: XCF, FX, DC. Now, $Count_F(X)=1$ (only in string FCX does F precede X). And, $Count_X^D(F)=1$ (only in string XCF does X precede F).

Consider now the identity: $Count_F(X)=Count_X^D(F)$;

$$\frac{Count_F(X)}{Count(X)} = \frac{Count_X^D(F)}{Count^D(X)}.$$

Thus, $Rel_F(X) = \frac{Count_X^D(F)}{\sum_{i \in Web} Count_X(i)} \times \sum_{i \in Web} \frac{Count_X(i)}{Count^D(X)}.$ Since $Count^D(X)=Count_X^D(X)$, $$Rel_F(X) = \frac{P_X^D(F)}{P_X^D(X)} \qquad (24)$$

The topic relevance of X in topic F is proportional to the topic rank of F in topic X in the dual web graph. One way of computing the topic relevance of X in every topic on the web is as follows: First, construct the dual web graph as given in the previous section. Next, select web page X as the topic. Next, compute the topic ranks of every web page for topic X in the dual web graph using the standard method of computing topic ranks. Finally, apply the formula above to get the topic relevance of X in every topic.

Now, consider the Dual Web Graph, and consider in particular: $Rel_F^D(X)$. In some embodiments, the above formula is used, noting that the dual of the dual web graph is the regular web graph. Thus:

$$\frac{P_X(F)}{P_X(X)} = Rel_F^D(X) \qquad (25)$$

The topic rank of X in all topics F can thus be computed by computing the topic relevance of F in topic X in the dual web graph.

Figure 7:
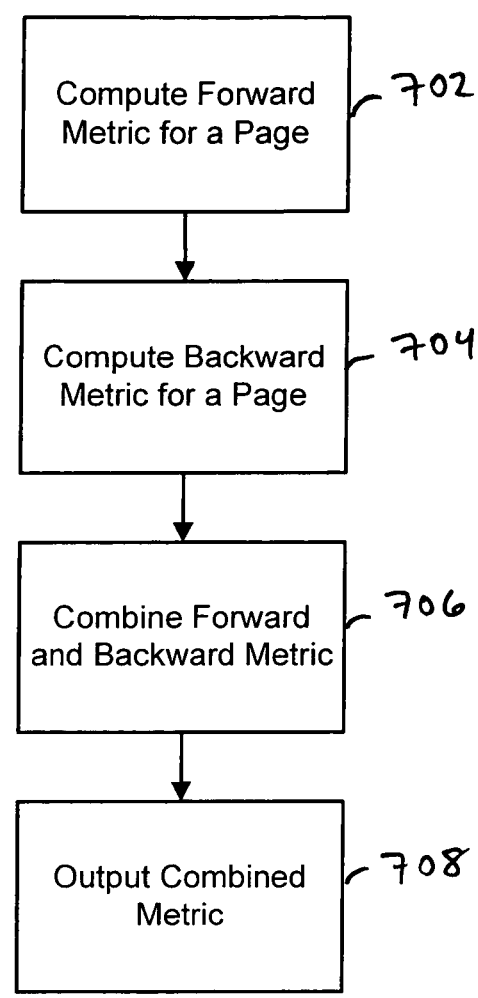
FIG. 7 is illustrates an embodiment of a process for scoring a document.

FIG. 7 is illustrates an embodiment of a process for scoring a document. The process may be implemented in link analysis engine 108. The process begins at 702 when a forward metric, such as the topic relevance of F in topic X is computed in usual manner. At 704, the metric is computed in the dual graph. At 706, the forward and backward metrics are combined. The metrics may be combined in a variety of ways. For example, a product of the metrics may be taken. The metrics may also be weighted—for example, with the forward metric weighted more than the backward metric. The process ends at 708 when the combined metrics are outputted, for example, into a relation.

Hub and Authority Topics

Consider creating an Oakland Raiders topic. The Oakland Raiders website appears like the right page to use to define this topic. Unfortunately, the site is not much of a hub page— it has few outlinks and is more of an "authority" page—one that hubs point to.

In general, a Web Page has both Hub and Authority components. In the formulations above, topic computations are hub-based. However, authority web pages can also be used.

Given a Web Page F that defines the Topic, and any page X, an authority topic rank ($P_F^A(X)$) and authority topic relevance ($Rel_F^A(X)$) can be defined as follows. Here, the superscript A and H to refer to Authority and Hub variants respectively. A topic notation without a superscript is assumed to involve hubs:

$$P_F^A(X)=Rel_X^H(F)=Rel_X(F) \qquad (26)$$

$$Rel_F^A(X)=P_X^H(F)=P_X(F) \qquad (27)$$

Consider the topic web page F and the random surfer. Assume the random surfer has a Visited_j variable for every web page J. If for any web page X, $Count_X(F)$ (the number of visits to F that were preceded by a visit to X), is a significant fraction of Count(F) (the total number of visits to F), X is a significant source of traffic to F. This is a popularity metric— while X may account for a lot of F's traffic, X may just be a general high-traffic site and may not be particularly relevant to F. A measure of topic relevance is needed: if a random surfer visits X, with high probability he visits F, which is given by the hub topic rank of F in X.

In some embodiments, the authority topic rank and relevance of any page X for a given topic F are the same (within a constant factor) as the hub topic rank and relevance of the page X in topic F in the dual web graph. The constant factor can be derived by approximating $P_X(X)$ by $(1-\beta)$—the probability of teleport.

When there is a page for which a topic is to be computed, both hub and authority topics can be computed and the scores combined appropriately when search results are ranked.

Computing Topic Relevance

Topic relevance can be computed with respect to seed sets of any size. Instead of stating the definition of topic relevance in terms of a single random walker, a large collection of random walkers can be employed.

Suppose a web graph has N nodes. Hypothetical random surfers pursue random walks on the web with a teleport parameter $\beta$ (i.e., the probability of teleport at each step is 1−β). Suppose that the number M of such random walkers is very large, i.e., M>>N and the random walks have settled to equilibrium distributions.

The Page Rank of a page p is the fraction of the total number of random walkers that are on p at any point in time. Using r to denote the Page Rank vector, and r(p) to denote the Page Rank of page p, suppose the number of random surfers at page p is M(p). Then, $$r(p) = \frac{M(p)}{M} \quad (28)$$

Now suppose a set S of seed pages is selected for a topic. In some embodiments, each random surfer is in one of two states: relevant and irrelevant. Here, each surfer is initially in the irrelevant state. When a surfer visits a seed set page, his state changes to relevant (independent of his prior state). These surfers are referred to herein as relevant surfers. When a surfer teleports at random, his state changes to irrelevant. These surfers are referred to herein as irrelevant surfers.

At any time t, the number of relevant surfers at node p can be denoted as $M_R(p)$. The relevance of p is the fraction of the surfers at p who are relevant. The relevance vector is denoted x and the relevance of p is denoted x(p). Then:

$$x(p) = \frac{M_R(p)}{M(p)} \quad (29)$$

If p∈S, then $M_R(p)=M(p)$, and so x(p)=1.

Non-Teleport Topic Relevance

Of these random surfers, let M'(p) denote the number that got to b by following a link (i.e., those that did not teleport directly to p). The non-teleport Page Rank (NTPR) of p, denoted r'(p) can be defined as:

$$r'(p) = \frac{M'(p)}{M} \quad (30)$$

Figure 8:
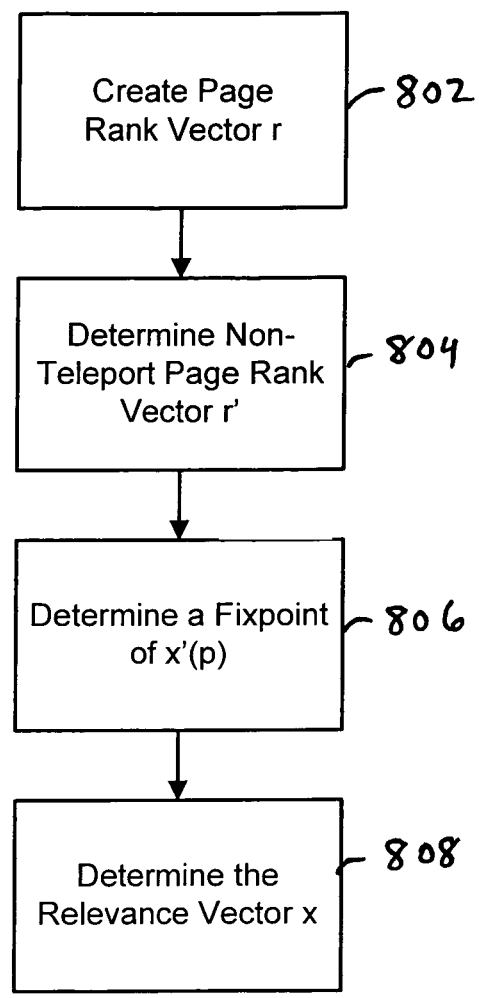
FIG. 8 illustrates an embodiment of a process for determining a relevance vector.

FIG. 8 illustrates an embodiment of a process for determining a relevance vector. This process may be implemented in link analysis engine 108. In the example shown, the process begins at 802 when a typical Page Rank vector r is determined.

At 804, a non-teleport Page Rank vector r' is determined. There is a relationship between r and r'. Since there are M random surfers, at any time step (1-β)M teleport. Since the teleports are uniformly at random, the number of surfers who teleport into p at any time step is $$(1-\beta)\frac{M}{N}.$$

Therefore:

$$M'(p) = M(p) - \frac{1-\beta}{N}M \quad (31)$$

And thus, the following is one way of determining the NTPR:

$$r'(p) = r(p) - \frac{1-\beta}{N} \quad (32)$$

The non-teleport topic relevance (NTTR) of p, denoted by x'(p) can be defined as follows:

$$x'(p) = \frac{M_R(p)}{M'(p)} \quad (33)$$

In this example, if p∈S, $M_R(p)=M(p)>M'(p)$, and so x'(p)>1. The following formula relates x(p) and x'(p):

$$x'(p) = \frac{M_R(p)}{M'(p)} \quad (34)$$
$$= \frac{M_R(p)}{M(p) - \frac{1-\beta}{N}M}$$

This can be simplified, noting that $$\frac{M}{M(p)} = \frac{1}{r(p)},$$

as follows:

$$x(p) = \left(1 - \frac{1-\beta}{Nr(p)}\right)x'(p) \quad (35)$$

A recursive formula can be derived that relates the NTTR of a node to that of its neighbors. This formula can be used as the basis of a graph computation for NTTR.

Consider the relevant surfers at page p∉S at time t+1. The number of surfers at p is M(p), and the number of relevant surfers is $M_R(p)=x'(p)M'(p)$. The in-neighbors and out-neighbors of p can be denoted I(p) and O(p), respectively. In this example, each of these surfers came from an in-neighbor of p. Suppose q∈I(p). At time t, the number of random surfers at q is M(q), and the number of relevant random surfers is $M_R(q)=x'(q)M'(q)$. Of these relevant surfers, a fraction β follows outlinks and a fraction 1−β teleports out of q. The number of relevant surfers from q that land up at p at time t+1 is therefore $$\frac{\beta}{|O(q)|}M_R(q) = \frac{\beta}{|O(q)|}x'(q)M'(q).$$

Thus, at equilibrium:

$$x'(p)M'(p) = \sum_{q \in I(p)} \frac{\beta}{|O(q)|}x'(q)M'(q) \quad (36)$$

Dividing through by M, and using $$r'(p) = \frac{M'(p)}{M},$$

this can be rewritten as:

$$x'(p)r'(p) = \sum_{q \in I(p)} \frac{\beta}{|O(q)|} x'(q)r'(q) \quad (37)$$

It was previously assumed that p∈S. If p∈S, then x(p) is 1. Thus, the following recursive formula for x'(p) can be given:

$$x'(p) = \begin{cases} \dfrac{1}{1 - \dfrac{1-\beta}{Nr(p)}} & \text{if } p \in S \\ \dfrac{1}{r'(p)} \sum_{q \in I(p)} \dfrac{\beta}{|O(q)|} x'(q)r'(q) & \text{if } p \notin S \end{cases} \quad (38)$$

At 806, a link-based graph computation is used to compute a fixpoint for the recursive equation given above. In some embodiments, pages in the set S are initialized to non-zero values, and the other nodes are initialized to 0.

At 808, the relevance vector x is computed, for example, using $$x(p) = \left(1 - \frac{1-\beta}{Nr(p)}\right) x'(p)$$

as described above.

A matrix equation for NTTR can be used. Define an N×N matrix R and N×1 vector $x'_0$ as follows:

$$R_{pq} = \begin{cases} \dfrac{\beta}{|O(q)|} \dfrac{r'(q)}{r'(p)} & \text{if } p \in S \text{ and } q \in I(p) \\ 0 & \text{otherwise} \end{cases} \quad (39)$$

$$x'_0(p) = \begin{cases} \dfrac{1}{1 - \dfrac{1-\beta}{Nr(p)}} & \text{if } p \in S \\ 0 & \text{otherwise} \end{cases}$$

The recursive formula previously given (Eq. 14) can be rewritten as the following linear matrix equation (a Sylvester Equation):

$$x' = Rx' + x'_0 \quad (40)$$

In this example, the matrix R is not stochastic, unlike the corresponding matrix A in the Page Rank equation. Correspondingly, relevance vector x' is also not a probability vector.

Hierarchical Topic Relevance

Multiple topics can be organized into a topic hierarchy. For example, a topic hierarchy can be implemented in a tree or a directed acyclic graph (DAG), with the children of a node (e.g., football, basketball), being subtopics of the parent (e.g., sports). As described in more detail below, the relevance of each page with respect to each topic in the hierarchy can be computed.

"Children's health" is an example subtopic of "health." Consider a search, such as "music," in the context of children's health. In some cases, high on the results list might be pages about music as it relates to general health. This is because pages that are relevant to general health may also obtain good relevance scores for children's health, due to topic drift.

Hierarchical topic relevance can be used to minimize topic drift by taking advantage of information encoded in the topic hierarchy.

Suppose a web graph has N nodes and there are a large number of random surfers pursuing random walks on the web, with teleport parameter β (i.e., probability of teleport at each step is 1−β). Suppose that the number M of such random walkers is very large, i.e., M>>N, and the random walks have settled to equilibrium.

The typical Page Rank of a page p is the fraction of the total number of random walkers that are on p at any point in time. Using r to denote the Page Rank vector, and r(p) to denote the Page Rank of page p, suppose the number of random surfers at page p is M(p). Then:

$$r(p) = \frac{M(p)}{M} \quad (41)$$

Suppose there is a topic hierarchy H, organized as a tree or as a DAG. In this example, there is a seed set of pages associated with every topic T in the hierarchy. Here, the seed set for a topic includes the seed sets of all of its subtopics, but may contain additional pages that are not in the seed sets of any of its subtopics. A pair of topics in this example is said to be unrelated if neither is an ancestor or descendant of the other. In other cases, these assumptions are not strictly adhered to. For example, other seed sets may be used as applicable.

Consider some topic T in H, and denote its seed set by S(T). Associated with each topic is also an excluded set of pages, which is denoted by E(T). In this case, the excluded set contains pages that are known not to belong to topic T. One way to construct E(T) is to set it equal to the union of the seed sets of all the topics in the hierarchy that are not subtopics of T (in particular, E(T)) includes the seed sets of the ancestors of T). Here, generically popular pages, such as Yahoo.com and Google.com are included in the seed set of the root of the hierarchy.

Suppose that each random surfer is in one of two states: relevant, and irrelevant. Initially, each surfer is in the irrelevant state. In some embodiments, surfers follow the following rules. When a surfer visits a seed set page, his state changes to relevant (independent of his prior state). These surfers are referred to herein as relevant surfers. When a surfer teleports at random, his state changes to irrelevant. These surfers are referred to herein as irrelevant surfers. When a surfer visits an excluded page, his state changes to irrelevant.

At any time t, let $M_R(p)$ denote the number of relevant surfers at node p. the relevance of p is the fraction of the surfers at p who are relevant. The relevance vector is denoted here by x and the relevance of p is denoted by x(p). Then:

$$x(p) = \frac{M_R(p)}{M(p)} \quad (42)$$

If p∈S(T), then $M_R(p)$=M(p), and so x(p)=1. If p∈E(T), then x(p)=0.

The iterative process described in conjunction with FIG. 8 above can be modified to compute hierarchical topic relevance. One way this can be accomplished is by modifying the manner in which the excluded set is treated. The values for the excluded set can be pinned at 0 and not updated in the usual manner. At the portion corresponding to 806 in this modified scheme, hierarchical topic relevance will have been computed.

Another approach is to estimate hierarchical relevance using the ordinary relevance. In the case where the excluded set contains a single page, a closed formula can be derived. In some embodiments, the matrix formulation of relevance is extended to incorporate excluded pages.

In some embodiments, instead of setting the relevance of the excluded pages to zero, set their relevance to a small non-zero value. A different value for each excluded page may be used, for example, depending on the relatedness of topics in the hierarchy.

In some embodiments, instead of (or in addition to) the excluded set, compute a value for each page that expresses its contribution to topic drift. This number may be measured in a manner similar to source scores in DIFR and will make relevance into a double-iterative algorithm like DIFR.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer implemented method of determining the relevance of a destination page to a topic comprising:
   determining a plurality of paths that include arrivals at the destination page, at least in part by modeling a random surfer who visits links in accordance with a mathematical model, the random surfer having one of a plurality of associated states, the states indicating whether the surfer has visited at least one seed page included in a seed set that includes a plurality of seed pages;
   determining the relevance of the surfer as either being relevant or irrelevant based at least in part on the surfer's behaviors corresponding to the plurality of paths; and
   determining the relevance of the destination page to the topic, at least in part by determining a ratio of (1) a measure of paths included in the plurality that include an arrival at a distinguished page preceding an arrival at the destination page and (2) a measure of the plurality of paths and (3) the relevance of the surfers corresponding to the plurality of paths.

2. The method of claim 1 wherein determining a proportion of the paths includes counting all arrivals at the destination page and counting all arrivals at the page preceded by arrivals at the distinguished page.

3. The method of claim 1 wherein the proportion is weighted.

4. The method of claim 1 wherein determining the relevance includes determining a backward relevance.

5. The method of claim 1 wherein determining the relevance includes determining a non-teleport relevance.

6. A system for determining the relevance of a destination page to a topic comprising:
   a processor, configured to:
      determine a plurality of paths that include arrivals at the destination page, at least in part by modeling a random surfer who visits links in accordance with a mathematical model, the random surfer having one of a plurality of associated states, the states indicating whether the surfer has visited at least one seed page included in a seed set that includes a plurality of seed pages;
      determine the relevance of surfer as either being relevant or irrelevant based at least in part on the surfer's behaviors corresponding to the plurality of paths;
      determine the relevance of the destination page to the topic, at least in part by determining a ratio of (1) a measure of paths included in the plurality that include an arrival at a distinguished page preceding an arrival at the destination page and (2) a measure of the plurality of paths and (3) the relevance of the surfers corresponding to the plurality of paths; and
   a memory, coupled with the processor, wherein the memory is configured to provide the processor with instructions.

7. The system of claim 6 wherein determining a proportion of the paths includes counting all arrivals at the destination page and counting all arrivals at the page preceded by arrivals at the distinguished page.

8. The system of claim 6 wherein the proportion is weighted.

9. The system of claim 6 wherein determining the relevance includes determining a backward relevance.

10. The system of claim 6 wherein determining the relevance includes determining a non-teleport relevance.

11. A computer program product for determining the relevance of a destination page to a topic, the computer program product being embodied in a computer readable storage medium and comprising computer instructions for:
    determining a plurality of paths that include arrivals at the destination page, at least in part by modeling a random surfer who visits links in accordance with a mathematical model, the random surfer having one of a plurality of associated states, the states indicating whether the surfer has visited at least one seed page included in a seed set that includes a plurality of seed pages;
    determining the relevance of surfer as either being relevant or irrelevant based at least in part on the surfer's behaviors corresponding to the plurality of paths;
    and
    determining the relevance of the destination page to the topic, at least in part by determining a ratio of (1) a measure of paths included in the plurality that include an arrival at a distinguished page preceding an arrival at the destination page and (2) a measure of the plurality of paths and (3) the relevance of the surfers corresponding to the plurality of paths.

12. A computer program product as recited in claim 11, wherein determining a proportion of the paths includes counting all arrivals at the destination page and counting all arrivals at the page preceded by arrivals at the distinguished page.

13. A computer program product as recited in claim 11, wherein determining the relevance includes determining a backward relevance.

14. A computer program product as recited in claim 11, wherein determining the relevance includes determining a non-teleport relevance.

15. A computer program product as recited in claim 11, wherein the proportion is weighted.

* * * * *